United States Patent [19]

Haluch

[11] 4,136,897
[45] Jan. 30, 1979

[54] COUPLING DEVICE FOR TUBULAR MEMBERS

[75] Inventor: David A. Haluch, Plainwell, Mich.

[73] Assignee: Parker-Hannifin Corporation, Cleveland, Ohio

[21] Appl. No.: 828,352

[22] Filed: Aug. 29, 1977

Related U.S. Application Data

[63] Continuation of Ser. No. 674,956, Apr. 8, 1976.

[51] Int. Cl.² .................................................. F16L 11/08
[52] U.S. Cl. ..................................... 285/342; 285/350; 285/382.7
[58] Field of Search ............ 285/341, 342, 343, 382.7, 285/350

[56] References Cited

U.S. PATENT DOCUMENTS

| | | | |
|---|---|---|---|
| 2,059,920 | 11/1936 | Weatherhead | 285/382.7 |
| 2,466,527 | 4/1949 | Wolfram | 285/343 |
| 2,522,785 | 9/1950 | Hanson | 285/382.7 X |
| 3,290,069 | 12/1966 | Davis | 285/341 |
| 3,582,115 | 1/1971 | Clague | 285/341 |
| 3,695,640 | 10/1972 | Clague | 285/341 |
| 3,857,591 | 12/1972 | Voss | 285/341 |
| 3,879,070 | 4/1975 | Russ | 285/342 |
| 4,037,864 | 7/1977 | Anderson et al. | 285/382.7 X |

FOREIGN PATENT DOCUMENTS

| | | | |
|---|---|---|---|
| 1600600 | 4/1970 | Fed. Rep. of Germany | 285/382.7 |
| 1912337 | 10/1970 | Fed. Rep. of Germany | 285/341 |
| 2144031 | 3/1973 | Fed. Rep. of Germany | 285/342 |
| 1550455 | 11/1968 | France | 285/341 |

*Primary Examiner*—Dave W. Arola
*Attorney, Agent, or Firm*—John N. Wolfram

[57] ABSTRACT

A coupling device includes a nut releasably engaging a body which receives a tubular member. A sleeve which attaches to the nut telescopes over the tubular member and includes grooves for gripping the tubular member and an undercut recess for carrying a seal. An outer recess on the sleeve receives an inturned flange on the nut for attaching the nut and sleeve. A leading edge on the sleeve abuts the body and the inturned flange is movable from a first cylindrical section formed by the outer recess to a second cylindrical section via a tapered surface to radially contract the sleeve thereby engaging the grooves with the tubular member. The nut carries a major portion of the sleeve and the seal within an inner bore on the nut and the sleeve, seal and nut comprise a unitary assembly for telescoping over the tubular member.

5 Claims, 3 Drawing Figures

COUPLING DEVICE FOR TUBULAR MEMBERS

This is a continuation, of application Ser. No. 674,956, filed Apr. 8, 1976.

BACKGROUND OF THE INVENTION

Heretofore coupling devices for holding tubular members to a body or fitting included a sleeve or gripping ring, a nut and a seal. Generally, these parts were individually slipped over the tubular member and the nut tightened to the body in order to retain the tubular member in connection with the body. Because these parts were separate this device required manipulation of several pieces before the desired coupling could be assembled and the tubular member fastened to the fitting.

When these devices were preassembled, the assembled coupling device was generally an extended construction with a chain connection between the nut, sleeve and seal.

Moreover, the prior art coupling devices increased the radial contraction of the sleeve with further tightening of the nut to the body. Therefore, if the nut was overtightened an excessive amount of radial contraction of the sleeve resulted, which possibly damaged the tubular member.

SUMMARY OF THE INVENTION

In accordance with the present invention a coupling device for fastening a tubular member to a body comprises a nut, a sleeve and a seal. The sleeve telescopes over the tubular member in close sliding fit therewith and includes an outer recess. Telescoping over the sleeve, an inner bore on the nut leads to an inturned flange in sliding fit with the outer recess on the sleeve. A pair of cylindrical sections separated by a tapered surface controls the amount of radial contraction of the sleeve when the inturned flange moves from a first cylindrical section formed by the outer recess to a second cylindrical section via the tapered surface. An inner recess is also provided on the sleeve for receiving and retaining the seal.

More specifically, slots on the sleeve allow for the radial contraction of the sleeve for insertion of the sleeve into the opening formed by the inturned flange of the nut so that upon radial expansion the outer recess is in sliding fit with the inturned flange to connect the sleeve to the nut. The sleeve is also provided with internal grooves for gripping the tubular member. A sleeve leading edge abuts the body when the nut is engaged to the body so that the sleeve is restrained from axial movement while further engagement between the nut and sleeve moves the inturned flange from the first cylindrical section to the second cylindrical section via the tapered surface to radially contract the sleeve.

The present invention also provides for the compact preassembly of the nut, sleeve and seal. To accomplish this, a major portion of the sleeve and the seal are disposed within the inner bore of the nut when the nut carries the sleeve and seal. Such compact structure provides for the easy installation of the coupling device over the tubular member and also utilizes the nut as a protective shield or cover for the sleeve and seal.

DETAIL DESCRIPTION

Figure 1:
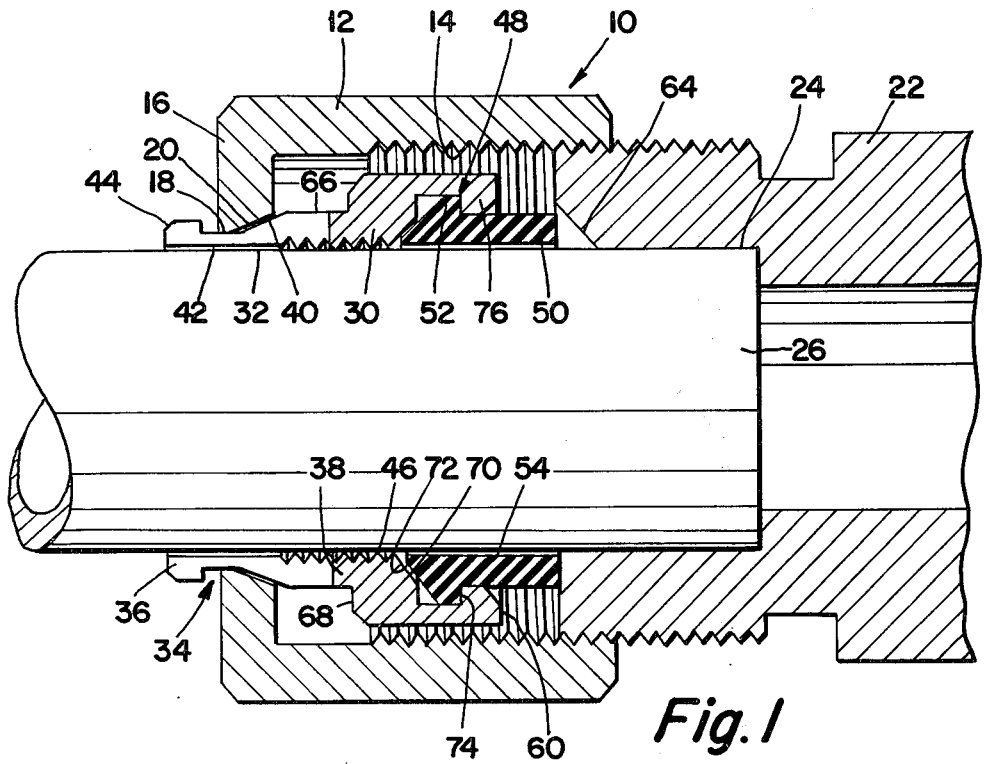
FIG. 1 is an enlarged cross section view of the coupling device of the present invention shown partially connected to a body receiving a tubular member.

In the illustrated form of the invention a coupling device, generally referred to as 10, is shown in FIG. 1. A nut 12 cooperates with a body via internal threads on the inner bore 14. Transversely extending from the inner bore an inturned flange 16 terminates in a cylindrical face 18 and an adjoining frusto-conical surface 20.

A bore 24 within the body 22 receives a tubular member 26 to communicate a passage through the body with the tubular member passage. Generally, the tubular member comprises a Nylon tube having an outer diameter substantially equal to the diameter of the bore 24 of the body; however, the features of the present invention apply equally to other tubular members.

In order to grip the tubular member a sleeve 30 having an inner bore 32 substantially equal to the diameter of the tubular member telescopes over the tubular member and attaches to the inturned flange of the nut. The attachment is provided by an outer recess 34 forming a cylindrical surface or section 42 and a collar 36. Slots 38 intersecting the first cylindrical section permit the radial contraction of the collar and first cylindrical section for insertion into the opening formed by the inturned flange whereupon radial expansion of the collar and the first cylindrical section disposes the section in sliding fit with the cylindrical face 18. In addition the collar 36 and a tapered surface 40 oppose the axial movement of the inturned flange relative to the sleeve so that the sleeve is carried by the nut. To facilitate the insertion of the sleeve into the opening formed by the inturned flange, a slanted surface 44 cooperates with the frusto-conical surface 20 such that the sleeve can be pushed into attachment with the inturned flange from the inner bore side of the inturned flange.

The sleeve 30 is provided with internal helical grooves or serrations 46 for increasing the grip of the sleeve on the tubular member and an undercut recess 48 adjacent the helical grooves. The undercut recess receives an annular seal 50 which includes a ridge 52 expanding into the recess so that the sleeve carries the seal. Extending axially away from the sleeve the seal includes an inner bore 54 substantially equal to the diameter of the tubular member and terminates within the inner bore of the nut so long as the sleeve remains attached to the nut and the ridge engaged to the undercut recess. Telescoping over a portion of the seal the undercut recess 48 prevents the radial expansion of that portion of the seal when the seal is compressed between the tubular member, sleeve and body.

Figure 2:
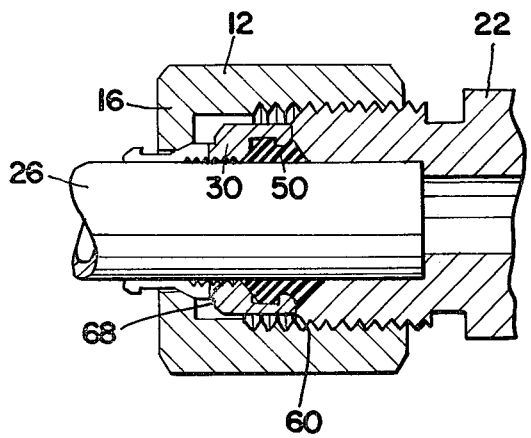
FIG. 2 is a cross section view of the coupling device shown in finger-tight assembly.

When the nut threadably engages the body, the sleeves and seal are slipped over the tubular member towards the body until a leading edge 60 on the sleeve abuts the body as illustrated in FIG. 2. Prior to the contact of the sleeve and body the seal 50 engages a beveled edge 64 which deforms and compresses the seal to prevent leakage between the tubular member and body. The edge 64 may also be outwardly curved relative to the bore 24 rather than frusto-conical as shown. When the sleeve abuts the body the seal is deformed to fill the cavity formed between the tubular member, body and sleeve. To insure complete filling of the cavity the seal is constructed with a volume exceeding the volume of the cavity. Further engagement of the nut and body after the sleeve contacts the body moves the inturned flange relative to the sleeve such that the frusto-conical surface 20 on the inturned nut engages the tapered surface 40 on the sleeve and slides towards the body thereby radially contracting the sleeve over the tubular member and urging the helical grooves into engagement with the tubular member.

Figure 3:
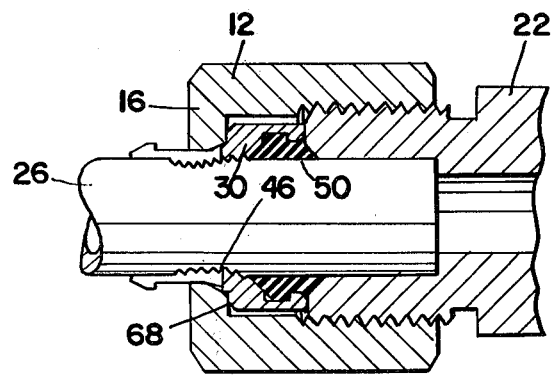
FIG. 3 is a cross section view of the coupling device shown in full assembly.

A second cylindrical surface or section 66 on the sleeve has a diameter that is about twice the height of the helical groove larger than the diameter of the first cylindrical section 42. Therefore, when the inturned flange slides past the tapered surface and the inner cylindrical face on the inturned flange is fitted over the second cylindrical surface, the sleeve is radially contracted to substantially engage the entire helical groove with the tubular member. Transversely extending from the second cylindrical section a shoulder 68 abuts the inturned flange when the nut is completely engaged to the body to stop further tightening of the nut, as illustrated in FIG. 3.

Preferably, the nut, sleeve and seal are preassembled before the parts are telescoped over the tubular member. When preassembled the nut carries the sleeve by means of the engagement between the inturned flange and the outer recess and the sleeve carries the seal by means of the engagement between the undercut recess and the ridge so that the nut carries the seal and sleeve. Moreover, with the sleeve telescoped into the inturned flange and inner bore of the nut and the seal telescoped into the undercut recess of the sleeve the coupling device is compactly preassembled. Also, the seal in the preassembled condition is always confined to the inner bore of the nut so that the nut covers and protects the axial surface of the seal.

More specifically, the seal 50 includes an inclined surface 70 engageable with an inner beveled surface 72 on the sleeve and a transverse face 74 engageable with an inturned end 76 on the sleeve, so that the seal is axially fixed to the sleeve when the ridge 52 engages the undercut recess 48. The inturned end forms a surface that contacts the cylindrical outer surface of the seal and is radially spaced from the inner bore 32 of the sleeve a distance substantially equal to the radial thickness of the cylindrical portion of the seal, so that seal and sleeve inner bores are equally in sliding fit with the tubular member.

Moreover, when the seal is deformed and compressed between the sleeve, body and tubular member the beveled surface 72 on the sleeve and the beveled or curved surface 64 on the body cooperate to urge the seal into tight contact with the tubular member.

I claim:

1. A coupling for tubes, comprising a body having a bore to receive a tube and having an abutment surface surrounding the axially outer end of said bore, a portion of said abutment surface having a tapered surface, a nut threadedly engaged with the body and having a inturned flange spaced from said abutment surface to form a chamber between the nut, body and tube, a one piece sleeve within said chamber, said sleeve having an undercut internal recess, an inner end and an outer end, said sleeve also having an axially outer face engageable by the inturned flange for moving the sleeve toward the body when the nut is threaded onto the body, a sealing ring of deformable material having an enlarged diameter portion received within said recess and having a cylindrical extension projecting from the sleeve toward said tapered surface, said recess having a transverse wall at its axially outer end and having a beveled surface intersecting said transverse wall and oppositely inclined to said tapered surface, and said sealing ring having a beveled face oppositely inclined to said tapered surface and adjacent said beveled surface so that upon threading of the nut onto the body the beveled surface will engage the beveled face and the cylindrical extension will engage said tapered surface causing the sealing ring to be deformed into tight sealing engagement with said tube.

2. The coupling of claim 1 in which said beveled face extends to the outer diameter of said enlarged diameter portion.

3. The coupling of claim 1 in which said abutment surface on the body includes a transverse face adjacent said tapered surface and said inner end of the sleeve includes a transverse face engageable with the transverse face of the body initially axially spaced therefrom but engageable therewith to limit movement of the sleeve toward the body, and said inner end of the sleeve includes an internal tapered surface axially opposite a portion of said tapered surface of the body forming a cavity therebetween when said sleeve transverse face engages said body transverse face and into which material of the sealing ring may be deformed.

4. A coupling for tubes, comprising a body having a bore to receive a tube and having an abutment surface surrounding the outer end of said bore, said abutment surface including a transverse face, a nut threadedly engaged with the body and having a tapered camming surface axially spaced from the body to form a chamber between the nut, body and tube, a sleeve within said chamber and having a recess, a sealing ring of deformable material having a first portion within said recess and a second portion extending axially inwardly of the sleeve toward said abutment surface, said sleeve having a transverse face engageable with said transverse face of the body and having a radially contractible portion toward its axially outer end and having a bore of a diameter to receive the tube, said contractible portion being engageable by said camming surface for moving the sleeve axially toward the body and for contracting the radially contractible portion into engagement with the tube, said sleeve bore having a smooth portion radially opposite an axially outer part of the contractible portion and terminating in a serrated portion radially opposite an axially inner part of the contractible portion and immediately adjacent said smooth portion whereby upon threading of the nut onto the body the smooth portion of the bore will be contracted into engagement with the tube first and followed by contraction of the serrated portion into engagement with the tube.

5. The coupling of claim 4 in which the radially contractible portion of the sleeve includes a tapered portion radially opposite the smooth bore portion and includes a cylindrical portion opposite the serrated bore portion to impose a maximum amount of radial contraction on said contractible portion, and said sleeve and nut having transverse surfaces engageable with each other for limiting further threading of the nut upon the body.

* * * * *